US012645523B2

(12) United States Patent
Ghosh et al.

(10) Patent No.: US 12,645,523 B2
(45) Date of Patent: Jun. 2, 2026

(54) SYSTEMS AND METHODS FOR DETERMINING EMBEDDING VECTOR FOR HETEROGENEOUS AND ASYNCHRONOUS IT OPERATIONS EVENT DATA

(71) Applicant: Fidelity Information Services, LLC, Jacksonville, FL (US)

(72) Inventors: Ranadhir Ghosh, St. Johns, FL (US); John Platais, Menomonee Falls, WI (US); Sriram Rajkumar, Chennai (IN)

(73) Assignee: Fidelity Information Services, LLC, Jacksonville, FL (US)

( * ) Notice: Subject to any disclaimer, the term of this patent is extended or adjusted under 35 U.S.C. 154(b) by 0 days.

(21) Appl. No.: 18/791,265

(22) Filed: Jul. 31, 2024

(65) Prior Publication Data

US 2026/0037357 A1 Feb. 5, 2026

(51) Int. Cl.
| | |
|---|---|
| *G06F 11/07* | (2006.01) |
| *G06F 11/22* | (2006.01) |
| *G06F 16/901* | (2019.01) |
| *G06F 16/906* | (2019.01) |

(52) U.S. Cl.
CPC ...... *G06F 11/0781* (2013.01); *G06F 11/0712* (2013.01); *G06F 11/0721* (2013.01); *G06F 11/0727* (2013.01); *G06F 11/0769* (2013.01); *G06F 11/079* (2013.01);
(Continued)

(58) Field of Classification Search
CPC .............. G06F 11/079; G06F 11/0712; G06F 11/0727; G06F 11/2257; G06F 11/2263
See application file for complete search history.

(56) References Cited

U.S. PATENT DOCUMENTS

| | | | |
|---|---|---|---|
| 11,442,963 B1 * | 9/2022 | Lecue ................... | G06F 16/906 |
| 2019/0286504 A1 * | 9/2019 | Muntés-Mulero .......................... | |
| | | | G06F 11/0709 |
| 2023/0088676 A1 | 3/2023 | She et al. | |

(Continued)

OTHER PUBLICATIONS

Wang, Wei & Wei, Xiangyu & Suo, Xiaoyang & Wang, Bin & Wang, Hao & Dai, Hong-Ning & Zhang, Xiangliang. (2021). HGATE: Heterogeneous Graph Attention Auto-Encoders. IEEE Transactions on Knowledge and Data Engineering. pp. 1-1. 10.1109/TKDE.2021.3138788. (Year: 2021).*

(Continued)

*Primary Examiner* — Ashish Thomas
*Assistant Examiner* — Catherine Marie Nguyen
(74) *Attorney, Agent, or Firm* — Bookoff McAndrews, PLLC

(57) ABSTRACT

A computer-implemented method for determining a signature embedding vector for information technology events. The method including: receiving a current data object representing an occurrence of an information technology event associated with a configurable item; obtaining a graph database of logical associations of the configurable item; applying a clustering algorithm to the graph database to determine a subset of graphs; extracting associated data of the subset of graphs; applying an embedding model to the extracted associated data to determine an embedding vector for each subset of graphs; aggregating the embedding vector for each subset of graphs to determine a signature embedding vector; and utilizing the signature embedding vector to perform further analysis of the current data object.

15 Claims, 6 Drawing Sheets

(52) U.S. Cl.
  CPC ...... *G06F 11/2257* (2013.01); *G06F 11/2263* (2013.01); *G06F 16/9024* (2019.01); *G06F 16/906* (2019.01)

(56) References Cited

U.S. PATENT DOCUMENTS

| | | | | |
|---|---|---|---|---|
| 2023/0102786 | A1* | 3/2023 | Garapati | G06N 20/20 |
| | | | | 706/50 |
| 2023/0289441 | A1* | 9/2023 | Abusnaina | G06F 21/566 |
| 2025/0209300 | A1* | 6/2025 | Mandal | G06N 5/022 |
| 2025/0247283 | A1* | 7/2025 | Zhang | H04L 41/0631 |
| 2025/0342378 | A1* | 11/2025 | Quiñones | G06N 3/044 |

OTHER PUBLICATIONS

J. Liu et al., "Incident-aware Duplicate Ticket Aggregation for Cloud Systems, " Jul. 14, 2023, IEEE/ACM 45th International Conference on Software Engineering (ICSE), Melbourne, Australia, 2023, pp. 2299-2311, doi: 10.1109/ICSE48619.2023.00193. (Year: 2023).*
International Search Report and Written Opinion issued in International Application No. PCT/US2025/029586, issued Aug. 12, 2025 (9 pages).

* cited by examiner

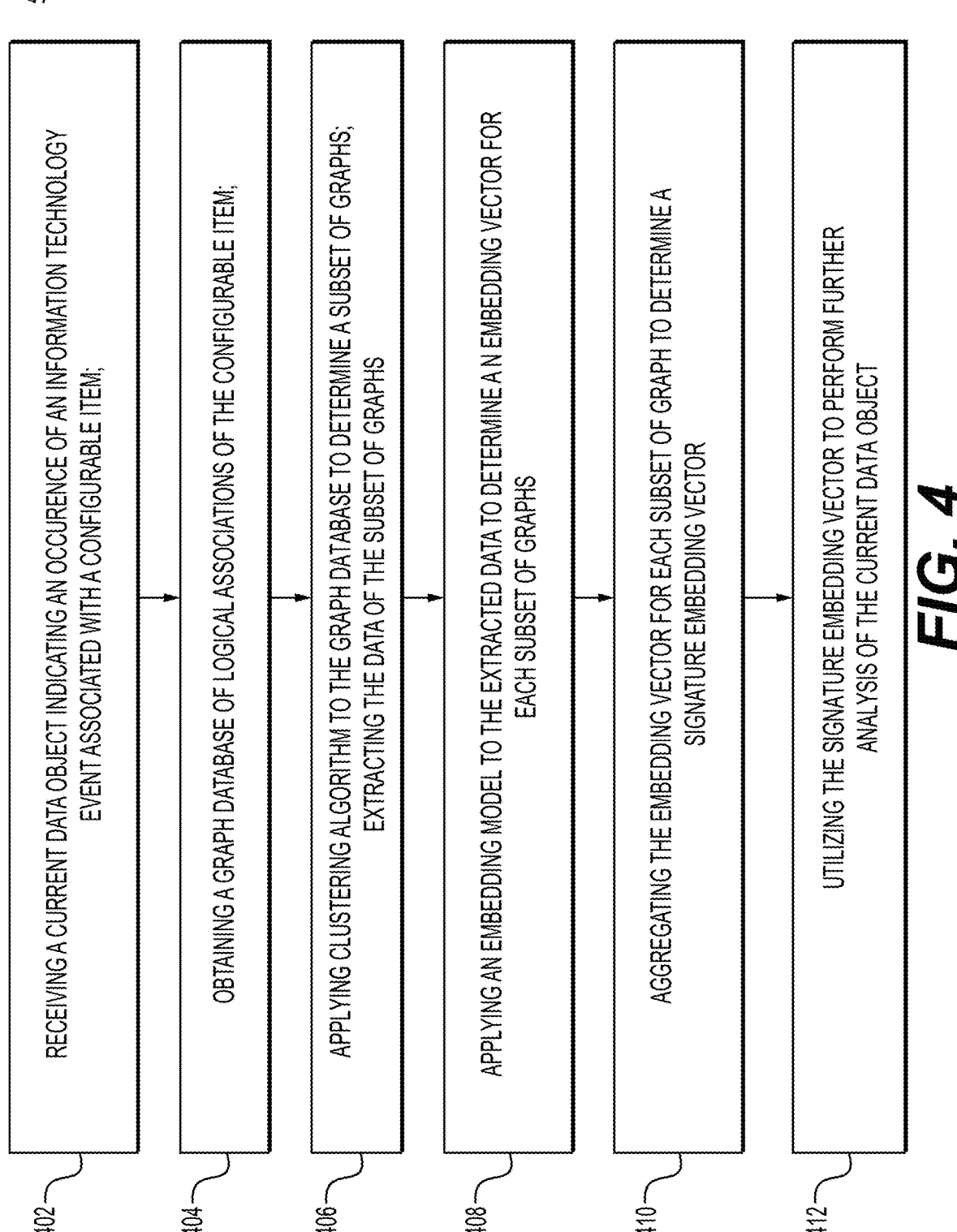

400

402 — RECEIVING A CURRENT DATA OBJECT INDICATING AN OCCURRENCE OF AN INFORMATION TECHNOLOGY EVENT ASSOCIATED WITH A CONFIGURABLE ITEM;

404 — OBTAINING A GRAPH DATABASE OF LOGICAL ASSOCIATIONS OF THE CONFIGURABLE ITEM;

406 — APPLYING CLUSTERING ALGORITHM TO THE GRAPH DATABASE TO DETERMINE A SUBSET OF GRAPHS; EXTRACTING THE DATA OF THE SUBSET OF GRAPHS

408 — APPLYING AN EMBEDDING MODEL TO THE EXTRACTED DATA TO DETERMINE A N EMBEDDING VECTOR FOR EACH SUBSET OF GRAPHS

410 — AGGREGATING THE EMBEDDING VECTOR FOR EACH SUBSET OF GRAPH TO DETERMINE A SIGNATURE EMBEDDING VECTOR

412 — UTILIZING THE SIGNATURE EMBEDDING VECTOR TO PERFORM FURTHER ANALYSIS OF THE CURRENT DATA OBJECT

FIG. 4

SYSTEMS AND METHODS FOR DETERMINING EMBEDDING VECTOR FOR HETEROGENEOUS AND ASYNCHRONOUS IT OPERATIONS EVENT DATA

TECHNICAL FIELD

Various embodiments of the present disclosure relate generally to information technology (IT) management systems and, more particularly, to systems and methods for determining embedding vector for heterogeneous and asynchronous IT operations event data

BACKGROUND

In computing systems, for example computing systems that perform financial services and electronic payment transactions, programing changes may occur. For example, software may be updated. Changes in the system may lead to, defects, issues, bugs or problems (collectively referred to as incidents) within the system. These incidents may occur at the time of a software change or at a later time. These incidents may be costly for the company, as users may not be able to use the services, and due to resources expended by the company to resolve the incidents.

These incidents in the system may need to be examined and resolved in order to have the software services perform correctly. Time may be spent by, for example, incident resolution teams, determining what issues arose within the software services. The faster an incident may be resolved, the less potential costs a company may incur. Thus, promptly identifying and fixing such incidents (e.g., writing new code or updating deployed code) may be important to a company.

Conventional information technology (IT) systems may struggle to analyze and group heterogeneous and asynchronous IT operations event data in a meaningful way. The data may be complex and difficult to interpret and group when applying conventional data organization techniques. The present disclosure is directed to addressing this and other drawbacks to the existing computing system incident analysis techniques.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

In some aspects, the techniques described herein relate to a computer-implemented method for determining a signature embedding vector for information technology events. The method including: receiving a current data object representing an occurrence of an information technology event associated with a configurable item; obtaining a graph database of logical associations of the configurable item; applying a clustering algorithm to the graph database to determine a subset of graphs; extracting associated data of the subset of graphs; applying an embedding model to the extracted associated data to determine an embedding vector for each subset of graphs; aggregating the embedding vector for each subset of graphs to determine a signature embedding vector; and utilizing the signature embedding vector to perform further analysis of the current data object.

In some aspects, the techniques described herein relate to a method, where the information technology event is either an alert, incident, problem, or change.

In some aspects, the techniques described herein relate to a method, further including: determining a line of business associated with the configurable item associated with the current data object by traversing nodes of the graph database until a line of business node indicates the line of business associated with the configurable item is determined; and determining all nodes and edges associated with the determined line of business node; wherein the clustering algorithm is only applied on the determined all nodes and edges associated with the determined line of business node.

In some aspects, the techniques described herein relate to a method, wherein the graph database of logical associations includes all nodes and relationships of the line of business and of related configurable items and IT events.

In some aspects, the techniques described herein relate to a method, wherein the clustering algorithm determines subsets of the graph database that have had a highest number of information technology events occur within a set period of time.

In some aspects, the techniques described herein relate to a method, wherein the embedding model includes a transformer with graph attention network encoder and a future node embedding predictor; wherein applying an embedding model to the extracted associated data to determine an embedding vector for each subset of graphs further includes: encoding and decoding, using the graph attention network encoder, the extracted associated data from each subset of graph, producing a respective linear output layer for each graph.

In some aspects, the techniques described herein relate to a method, wherein applying an embedding model to the extracted associated data to determine an embedding vector for each subset of graphs further includes:
reshaping, using the future node embedding predictor, the respective linear output layer for each subset of graph into the embedding vector for each subset of graph.

In some aspects, the techniques described herein relate to a system for determining a signature embedding vector for information technology events, the system including: a memory having processor-readable instructions stored therein; and at least one processor configured to access the memory and execute the processor-readable instructions to perform operations including: receiving a current data object representing an occurrence of an information technology event associated with a configurable item; obtaining a graph database of logical associations of the configurable item; applying a clustering algorithm to the graph database to determine a subset of graphs; extracting associated data of the subset of graphs; applying an embedding model to the extracted associated data to determine an embedding vector for each subset of graphs; aggregating the embedding vector for each subset of graphs to determine a signature embedding vector; and utilizing the signature embedding vector to perform further analysis of the current data object.

In some aspects, the techniques described herein relate to a system, where the information technology event is either an alert, incident, problem, or change.

In some aspects, the techniques described herein relate to a system, further including: determining a line of business associated with the configurable item associated with the current data object by traversing nodes of the graph database until a line of business node indicates the line of business associated with the configurable item is determined; and determining all nodes and edges associated with the determined line of business node; wherein the clustering algorithm is only applied on the determined all nodes and edges associated with the determined line of business node.

In some aspects, the techniques described herein relate to a system, wherein the graph database of logical associations includes all nodes and relationships of the line of business and of related configurable items and IT events.

In some aspects, the techniques described herein relate to a system, wherein the clustering algorithm determines subsets of the graph database that have had a highest number of information technology events occur within a set period of time.

In some aspects, the techniques described herein relate to a system, wherein the embedding model includes a transformer with graph attention network encoder and a future node embedding predictor; wherein applying an embedding model to the extracted associated data to determine an embedding vector for each subset of graphs further includes: encoding and decoding, using the graph attention network encoder, the extracted associated data from each subset of graph, producing a respective linear output layer for each graph.

In some aspects, the techniques described herein relate to a system, wherein applying an embedding model to the extracted associated data to determine an embedding vector for each subset of graphs further includes: reshaping, using the future node embedding predictor, the respective linear output layer for each subset of graph into the embedding vector for each subset of graph.

In some aspects, the techniques described herein relate to a non-transitory computer readable medium storing processor-readable instructions which, when executed by at least one processor, cause the at least one processor to perform operations including: receiving a current data object representing an occurrence of an information technology event associated with a configurable item; obtaining a graph database of logical associations of the configurable item; applying a clustering algorithm to the graph database to determine a subset of graphs; extracting associated data of the subset of graphs; applying an embedding model to the extracted associated data to determine an embedding vector for each subset of graphs; aggregating the embedding vector for each subset of graphs to determine a signature embedding vector; and utilizing the signature embedding vector to perform further analysis of the current data object.

In some aspects, the techniques described herein relate to a non-transitory computer readable medium, wherein the information technology event is either an alert, incident, problem, or change.

In some aspects, the techniques described herein relate to a non-transitory computer readable medium, further including: determining a line of business associated with the configurable item associated with the current data object by traversing nodes of the graph database until a line of business node indicates the line of business associated with the configurable item is determined; and determining all nodes and edges associated with the determined line of business node; wherein the clustering algorithm is only applied on the determined all nodes and edges associated with the determined line of business node.

In some aspects, the techniques described herein relate to a non-transitory computer readable medium, wherein the graph database of logical associations includes all nodes and relationships of the line of business and of related configurable items and IT events.

In some aspects, the techniques described herein relate to a non-transitory computer readable medium, wherein the clustering algorithm determines subsets of the graph database that have had a highest number of information technology events occur within a set period of time.

In some aspects, the techniques described herein relate to a non-transitory computer readable medium, wherein the embedding model includes a transformer with graph attention network encoder and a future node embedding predictor; wherein applying an embedding model to the extracted associated data to determine an embedding vector for each subset of graphs further includes: encoding and decoding, using the graph attention network encoder, the extracted associated data from each subset of graph, producing a respective linear output layer for each graph.

BRIEF DESCRIPTION OF THE DRAWINGS

The accompanying drawings, which are incorporated in and constitute a part of this specification, illustrate several embodiments and together with the description, serve to explain the principles of the disclosure.

FIG. 4 depicts a flowchart of a method for determining an embedding vector for information technology events, according to one or embodiments.

DETAILED DESCRIPTION OF EMBODIMENTS

Figure 1A:
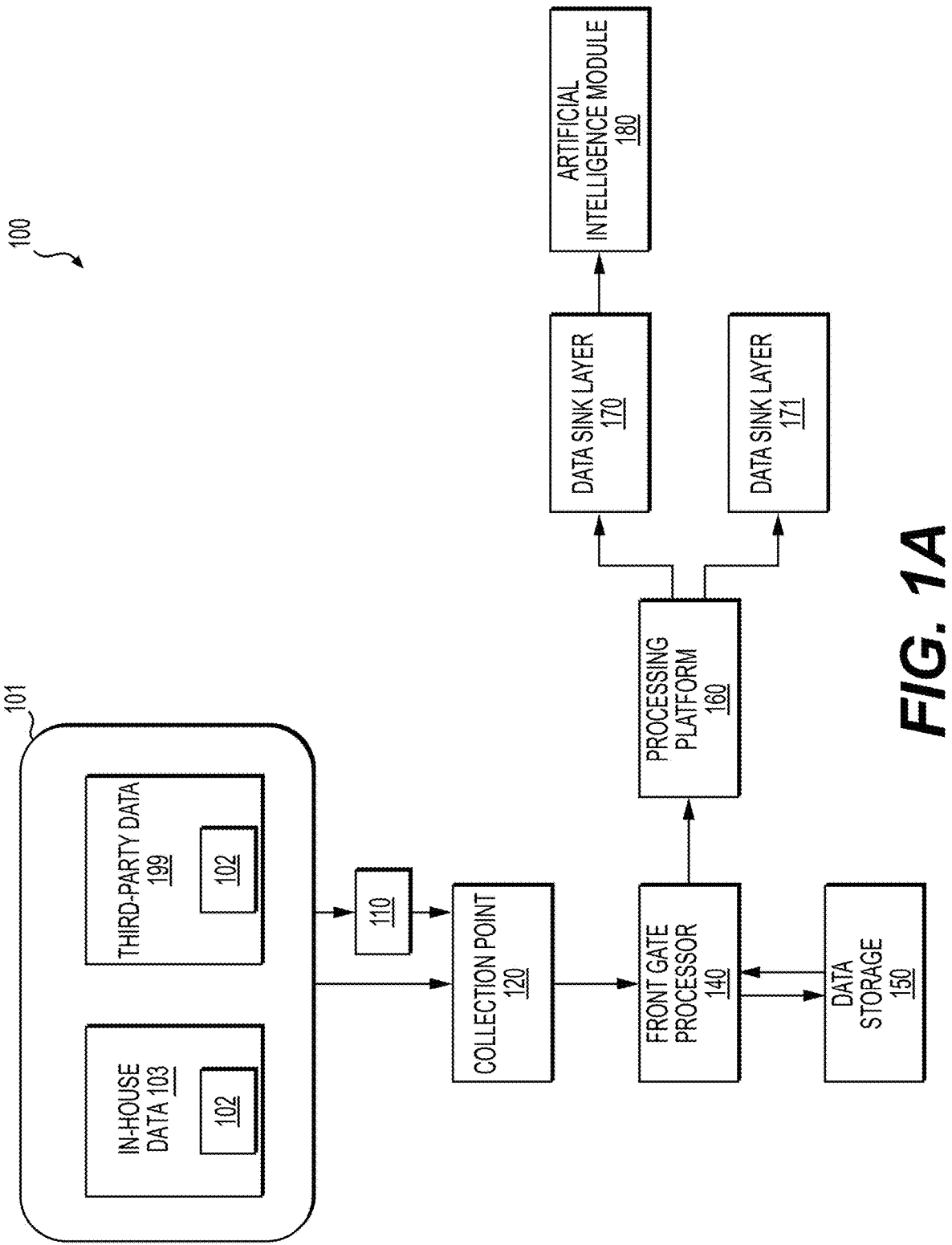
FIG. 1A depicts an exemplary system overview for a data pipeline for an artificial intelligence model to analyze information technology (IT) data in a system, according to one or more embodiments

Various embodiments of the present disclosure relate generally to information technology (IT) management systems and, more particularly, to systems and methods for determining embedding vector for heterogeneous and asynchronous IT operations event data.

The subject matter of the present disclosure will now be described more fully with reference to the accompanying drawings that show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment, and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Software companies have been struggling to avoid outages from incidents that may be caused by upgrading software or hardware components, or changing a member of a team, for example. The system described herein may be configured to analyze and/or process event data for an IT system. The system described herein may for example receive a stream of event data over periods of time. This event data may further be described as information technology (IT) event data. Event data may include, but is not limited: (1) an incident, (2) an alert, (3) change data, (4) a problem; and/or (5) an anomaly.

An incident may be an occurrence that can disrupt or cause a loss of operation, services, or functions of a system. Incidents may be manually reported by customers or personnel, may be automatically logged by internal systems, or may be captured in other ways. An incident may occur from factors such as hardware failure, software failure, software bugs, human error, and/or cyber attacks. Deploying, refactoring, or releasing software code may for example cause an incident. An incident may be detected during, for example, an outage or a performance change. An incident may include characteristics, where an incident characteristic may refer to the quality or traits associated with an incident. For example, incident characteristics may include, but is not limited to, the severity of an incident, the urgency of an incident, the complexity of an incident, the scope of an incident, the cause of an incident, and/or what configurable item corresponds to the incident (e.g., what systems/platforms/products etc. are affected by the incident), how it is described in freeform text, what business segment is affected, what category/subcategory is affected, and/or what assigned group is affected by the incident.

An alert may refer to a notification that informs a system or user of an event. An alert may include notification of a collection of events representing a deviation from normal behavior for a system. For example, an alert may include metadata including a short field description that includes free from text fields (e.g., a summary of the alert), first occurrences, time stamps, an alert key, etc. Understanding the different types of alerts within a system from various perspectives may assist in resolving incidents.

Change data may refer to information that describes a modification made to data within a system or database. Change data may track the changes that occur over one or more periods of time. Problem data may refer to any data that causes issues or impedes a systems normal operations.

Anomaly data may refer to data that indicates a deviation of a system from a standard or normal operation.

The event data may further include entities effected by the event and their respective relationships. Event data may be associated with one or more configurable items (CIs). A configurable item (CI) may refer to a component of a system which can be identified as a self-contained unit for purposes of change control and identification. For example, a particular application, service, particular product, and/or server, may be defined by a CI.

An incident may further be associated with a particular line of business (LOB). The LOB may refer to an assigned category, where the LOB may include association logic linking a LOB with one or more of: business services, service offerings, applications, application instances or web services, and/or servers and services. A LOB may be associated with a variety of CIs.

An IT management system may receive incidents (e.g., data objects indicating occurrences of incidents) at invariable rates throughout the day. When incidents are received, it may be unclear as to how a particular incident relates to previous incidents. Better understanding the relationship between received incidents, in comparison to similar past incidents, may assist a user or a system in identifying and potentially addressing incidents for a system.

Processing a vast amount of information, such as incidents, to produce meaningful and actionable insights in IT operations may be valuable to organizations. As IT management systems utilize sophisticated tools and sensors, billions of data points may be received, and information overload may become an issue to be resolved. It may be challenging to analyze and make sense of heterogeneous and asynchronous IT operations event data. The data may for example be complex and difficult to interpret using conventional techniques.

Conventional systems may include traditional data analysis methods that are not specifically designed to handle the complexity and heterogeneity of IT operations seven data associated with configuration item hierarchy structure. These methods may not effectively address the identified unmet needs of an IT system. Conventional system may for example apply natural language processing algorithms based embedding to better understand IT operation events or apply time series techniques to model the operation events. The conventional systems may not effectively utilize the hierarchy structure of event data to deal with the complex and heterogeneity of the event data.

Figure 3:
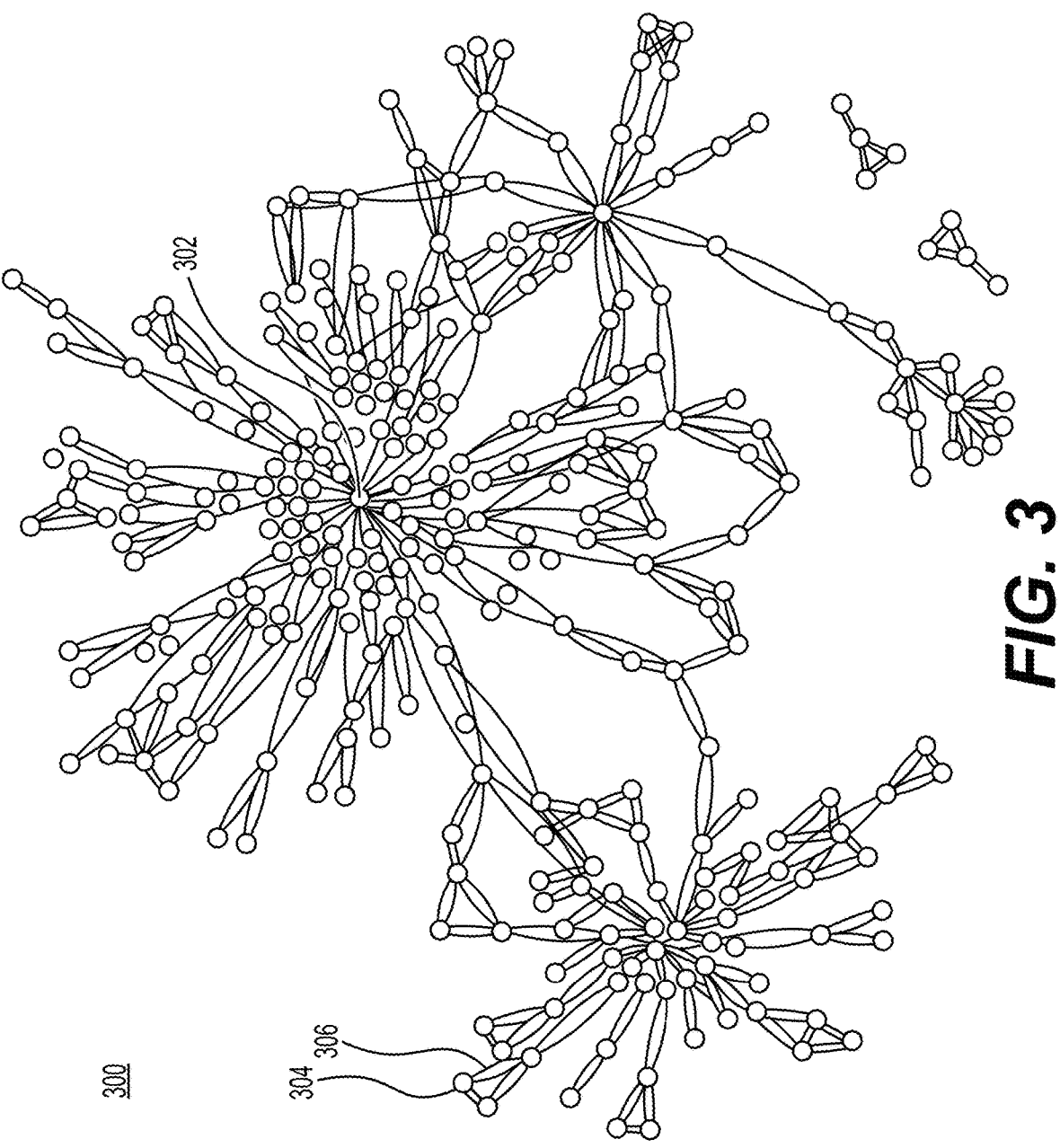
FIG. 3 depicts an exemplary graph of logical associations of a hierarchical structure for a line of business in a graph database, according to one or embodiments.

One or more embodiments may utilize an embedding model to efficiently process and analyze asynchronous IT operation event data to create embedding vectors. The event data may be organized within a hierarchical structure of logical associations, wherein the hierarchical structure defines a Line of Business (LOB) and connected event data using a graph database (e.g., as depicted in FIG. 3 below). The system described herein may be configured to generate embeddings for data (e.g., event data) which is not received at constant time intervals. The system may be configured to process multiple types of event data simultaneously (e.g., incident, alert, change, problem, etc.).

One or more embodiments may create an embedding to define an incident, wherein the embedding represents a summation of associated asynchronous event data that occurred within a set time prior to the incident. The determined vector may provide information as to what has occurred in a particular line of business for a system over a period of time.

One or more embodiments may allow for vectors to define CI and event data that was originally mislabeled. Initially entered event data may include a guess of an association for the particular event. For example, the wrong CI may be listed as affected (e.g., due to human error). However, as the event may still be stored in the particular graph and a part of the created embedding vector, then this may allow for the initially mislabeled data still to be incorporated into the created embedding vector. This may allow for the embedding vector to be more valuable in future analysis. Advantageously, by defining a vector in terms of related event data within a single LOB, an incident may have an incorrect configurable item, however, the embedding may define a set of events within a single LOB.

One or more embodiments may allow for various types of data processing in order to identify correlations, similarity, and root causes, and recommend a corrective action based on received data as well as user feedback mechanisms. One or more embodiments may be extended to users of services and software with applications that are connected to the system described herein.

The systems and methods described herein may enable identification of historically similar incidents to provide additional insights. The historically similar incidents may help a user to better understand the relationships between and among various incidents, and may provide insights into potential solutions.

Advantageously, the system described herein may be configured to advanced graph clustering, graph training with GAT and Transformer layers, and FAISS indexing for efficient analysis and utilization of asynchronous IT operations event data. This approach may address the complexity and inefficiency associated with large-scale LOBs and asynchronous event data.

Advantageously, the system described herein may provide efficient asynchronous event processing. The system may for example leverage a graph neural network architecture, GAT, which even processes events sparsely and asynchronously as temporally evolving graphs. This may allow for efficient processing of events without sacrificing sparsity and high temporal resolution, leading to improved efficiency in handling asynchronous IT operations event data.

Advantageously, the system described herein may for example provide enhanced graph embedding for downstream tasks. Graph embedding may serve as a preprocessing step for graphs, providing richer and more adaptable inputs for a wide spectrum of analyses and tasks, including node classification, graph classification, link prediction, clustering, and community detection. The techniques described herein may enable the generation of high-quality embeddings for downstream tasks, enhancing the overall utility of the embedded data Advantageously, the system described herein may apply advanced data integration and metadata handling techniques. The use of a graph database may demonstrate unique capabilities in handling graph analytics and metadata, providing solutions for data integration and replication. This may indicate advancements in managing and processing heterogeneous data using graph-based approaches, showcasing the potential for improved data integration and metadata handling.

Advantageously, the system described herein may for example provide scalable semantic search and efficient computations. Representing event data as spatio-temporal graphs may allow for efficient processing of incoming events by performing sparse but complete graph updates. The techniques described herein may demonstrate the potential for scalable semantic search and efficient asynchronous computations, allowing for processing asynchronous IT operations event data.

Advantageously, the system described herein may improve machine learning techniques through graphs. The techniques described herein may offer benefits such as link prediction, community detection, and node classification. By providing efficient graph embeddings, the techniques described herein contributes to improved machine learning on graphs, enhancing the applicability of machine learning techniques to the IT operations event data domain.

FIG. 1A depicts an exemplary system overview for a data pipeline for an artificial intelligence model to analyze IT data in a system, according to one or more embodiments. For example, the data pipeline system 100, may aggregate and send IT data to a sink layer 170. The data pipeline system 100 may be a platform with multiple interconnected components. The data pipeline system 100 may include one or more servers, intelligent networking devices, computing devices, components, and corresponding software for aggregating and processing data.

As shown in FIG. 1A, a data pipeline system 100 may include a data source 101, a collection point 120, a secondary collection point 110, a front gate processor 140, data storage 150, a processing platform 160, a data sink layer 170, a data sink layer 171, and an artificial intelligence module 180.

The data source 101 may include in-house data 103 and third party data 199. The in-house data 103 may be a data source directly linked to the data pipeline system 100. Third party data 199 may be a data source connected to the data pipeline system 100 externally as will be described in greater detail below.

Both the in-house data 103 and third party data 199 of the data source 101 may include incident data 102. Incident data 102 may include incident reports with information for each incident provided with one or more of an incident number, closed date/time, category, close code, close note, long description, short description, root cause, or assignment group. Incident data 102 may include incident reports with information for each incident provided with one or more of an issue key, description, summary, label, issue type, fix version, environment, author, or comments. Incident data 102 may include incident reports with information for each incident provided with one or more of a file name, script name, script type, script description, display identifier, message, committer type, committer link, properties, file changes, or branch information. Incident data 102 may include one or more of real-time data, market data, performance data, historical data, utilization data, infrastructure data, or security data. These are merely examples of information that may be used as data, and the disclosure is not limited to these examples.

Incident data 102 may be generated automatically by monitoring tools that generate alerts and incident data to provide notification of high-risk actions, failures in IT environment, and may be generated as tickets. Incident data may include metadata, such as, for example, text fields, identifying codes, and time stamps.

The in-house data 103 may be stored in a relational database including an incident table. The incident table may be provided as one or more tables, and may include, for example, one or more of problems, tasks, risk conditions, incidents, or changes. The relational database may be stored in a cloud. The relational database may be connected through encryption to a gateway. The relational database may send and receive periodic updates to and from the cloud. The cloud may be a remote cloud service, a local service, or any combination thereof. The cloud may include a gateway connected to a processing API configured to transfer data to the collection point 120 or a secondary collection point 110. The incident table may include incident data 102.

The data pipeline system 100 may include third party data 199 generated and maintained by third party data producers. Third party data producers may produce incident data 102 from Internet of Things (IoT) devices, desktop-level devices, and sensors. Third party data producers may include but are not limited to Tryambak, Appneta, Oracle, Prognosis, ThousandEyes, Zabbix, ServiceNow, Density, Dyatrace, etc. The incident data 102 may include metadata indicating that the data belongs to a particular client or associated system.

The data pipeline system 100 may include a secondary collection point 110 to collect and pre-process the incident data 102 from the data source 101. The secondary collection point 110 may be utilized prior to transferring data to a collection point 120. The secondary collection point 110 point may for example be an Apache Minifi software. In one example, the secondary collection point 110 may run on a microprocessor for a third party data producer. Each third party data producer may have an instance of the secondary collection point 110 running on a microprocessor. The secondary collection point 110 may support data formats including but not limited to JSON, CSV, Avro, ORC, HTML, XML, and Parquet. The secondary collection point 110 may encrypt incident data 102 collected from the third party data producers. The secondary collection point 110 may encrypt incident data, including, but not limited to, Mutual Authentication Transport Layer Security (mTLS), HTTPs, SSH, PGP, IPsec, and SSL. The secondary collection point 110 may perform initial transformation or processing of incident data 102. The secondary collection point 110 may be configured to collect data from a variety of protocols, have data provenance generated immediately, apply transformations and encryptions on the data, and prioritize data.

The data pipeline system 100 may include the collection point 120. The collection point 120 may be a system configured to provide a secure framework for routing, transforming, and delivering data across from the data source 101 to downstream processing devices (e.g., a front gate processor 140). The collection point 120 may for example be a software such as Apache NiFi. The collection point 120 may receive raw data and the data's corresponding fields such as the source name and ingestion time. The collection point 120 may run on a Linux Virtual Machine (VM) on a remote server. The collection point 120 may include one or more nodes. For example, the collection point 120 may receive incident data 102 directly from the data source 101. In another example, the collection point 120 may receive the incident data 102 from the secondary collection point 110. The secondary collection point 110 may transfer the incident data 102 to the collection point 120 using, for example, Site-to-Site protocol. The collection point 120 may include a flow algorithm. The flow algorithm may connect different processors, as described herein, to transfer and modify data from one source to another. For each third party data producer, the collection point 120 may have a separate flow algorithm. Each flow algorithm may include a processing group. The processing group may include one or more processors. The one or more processors may, for example, fetch the incident data 102 from the relational database. The one or more processors may utilize the processing API of the in-house data 103 to make an API call to a relational database to fetch incident data 102 from the incident table. The one or more processors may further transfer the incident data 102 to a destination system such as a front gate processor 140. The collection point 120 may encrypt data through HTTPS, Mutual Authentication Transport Layer Security (mTLS), SSH, PGP, IPsec, and/or SSL, etc. The collection point 120 may support data formats including but not limited to JSON, CSV, Avro, ORC, HTML, XML, and Parquet. The collection point 120 may be configured to write messages to clusters of a front gate processor 140 and communication with the front gate processor 140.

The data pipeline system 100 may include a distributed event streaming platform such as the front gate processor 140. The front gate processor 140 may be connected to and configured to receive data from the collection point 120. The front gate processor 140 may be implemented in an Apache Kafka cluster software system. The front gate processor 140 may include one or more message brokers and corresponding nodes. The message broker may for example be an intermediary computer program module that translates a message from the formal messaging protocol of the sender to the formal messaging protocol of the receiver. The message broker may be on a single node in the front gate processor 140. A message broker of the front gate processor 140 may run on a virtual machine (VM) on a remote server. The collection point 120 may send the incident data 102 to one or more of the message brokers of the front gate processor 140. Each message broker may include a topic to store similar categories of incident data 102. A topic may be an ordered log of events. Each topic may include one or more sub-topics. For example, one sub-topic may store the incident data 102 relating to network problems, and another sub-topic may store the incident data 102 related to security breaches from third party data producers. Each topic may further include one or more partitions. The partitions may be a systematic way of breaking the one topic log file into many logs, each of which can be hosted on a separate server. Each partition may be configured to store as much as a byte of the incident data 102. Each topic may be partitioned evenly between one or more message brokers to achieve load balancing and scalability. The front gate processor 140 may be configured to categorize the received data into a plurality of client categories, thereby forming a plurality of datasets associated with the respective client categories. These datasets may be stored separately within the storage device as described in greater detail below. The front gate processor 140 may further transfer data to storage and to processors for further processing.

For example, the front gate processor 140 may be configured to assign particular data to a corresponding topic. Alert sources may be assigned to an alert topic, and the incident data 102 may be assigned to an incident topic. Change data may be assigned to a change topic. Problem data may be assigned to a problem topic.

The data pipeline system 100 may include a software framework for data storage 150. The data storage 150 may be configured for long term storage and distributed processing. The data storage 150 may be implemented using, for example, Apache Hadoop. The data storage 150 may store the incident data 102 transferred from the front gate processor 140. In particular, the data storage 150 may be utilized for distributed processing of the incident data 102, and Hadoop distributed file system (HDFS) within the data storage may be used for organizing communications and storage of the incident data 102. For example, the HDFS may replicate any node from the front gate processor 140.

This replication may protect against hardware or software failures of the front gate processor 140. The processing may be performed in parallel on multiple servers simultaneously.

The data storage 150 may include an HDFS that is configured to receive the metadata (e.g., incident data). The data storage 150 may further apply an algorithm to process the data. This processing may allow for parallel processing of large data sets. This algorithm may be implemented by a MapReduce algorithm, for example. The data storage 150 may further aggregate and store the data. Algorithms within data storage 150 may be used for cluster resource management and planning tasks of the stored data. The algorithm may, for example, be Yet Another Resource Negotiation (YARN). For example, a cluster computing framework, such as the processing platform 160, may be arranged to further utilize the HDFS of the data storage 150. For example, if the data source 101 stops providing data, the processing platform 160 may be configured to retrieve data from the data storage 150 either directly or through the front gate processor 140. The data storage 150 may allow for the distributed processing of large data sets across clusters of computers using programming models. The data storage 150 may include a master node and an HDFS for distributing processing across a plurality of data nodes. The master node may store metadata such as the number of blocks and their locations. The main node may maintain the file system namespace and regulate client access to said files. The main node may comprise files and directories and perform file system executions such as naming, closing, and opening files. The data storage 150 may scale up from a single server to thousands of machines, each offering local computation and storage. The data storage 150 may be configured to store the incident data 102 in an unstructured, semi-structured, or structured form. In one example, the plurality of datasets associated with the respective client categories may be stored separately. The master node may store the metadata such as the separate dataset locations.

The data pipeline system 100 may include a real-time processing framework, e.g., a processing platform 160. In one example, the processing platform 160 may be a distributed dataflow engine that does not have its own storage layer. For example, this may be the software platform Apache Flink. In another example, the software platform Apache Spark may be utilized. The processing platform 160 may support stream processing and batch processing. Stream processing may be a type of data processing that performs continuous, real-time analysis of received data. Batch processing may involve receiving discrete data sets processed in batches. The processing platform 160 may include one or more nodes. The processing platform 160 may aggregate incident data 102 (e.g., incident data 102 that has been processed by the front gate processor 140) received from the front gate processor 140. The processing platform 160 may include one or more operators to transform and process the received data. For example, a single operator may filter the incident data 102 and then connect to another operator to perform further data transformation. The processing platform 160 may process incident data 102 in parallel. A single operator may be on a single node within the processing platform 160. The processing platform 160 may be configured to filter and only send particular processed data to a particular data sink layer. For example, depending on the data source of the incident data 102 (e.g., whether the data is in-house data 103 or third party data 199), the data may be transferred to a separate data sink layer (e.g., the data sink layer 170, or the data sink layer 171). Further, additional data that is not required at downstream modules (e.g., at the artificial intelligence module 180) may be filtered and excluded prior to transferring the data to a data sink layer.

The processing platform 160 may perform three functions. First, the processing platform 160 may perform data validation. The data's value, structure, and/or format may be matched with the schema of the destination (e.g., the data sink layer 170). Second, the processing platform 160 may perform a data transformation. For example, a source field, target field, function, and parameter from the data may be extracted. Based upon the extracted function of the data, a particular transformation may be applied. The transformation may reformat the data for a particular use downstream. A user may be able to select a particular format for downstream use. Third, the processing platform 160 may perform data routing. For example, the processing platform 160 may select the shortest and/or most reliable path to send data to a respective sink layer (e.g., the data sink layer 170 and/or the data sink layer 171).

In one example, the processing platform 160 may be configured to transfer particular sets of data to a data sink layer (e.g., the data sink layer 170 and/or the data sink layer 171). For example, the processing platform 160 may receive input variables for a particular artificial intelligence module 180. The processing platform 160 may then filter the data received from the front gate processor 140 and only transfer data related to the input variables of the artificial intelligence module 180 to a data sink layer (e.g., the data sink layer 170 and/or the data sink layer 171).

The data pipeline system 100 may include the one or more data sink layers (e.g., data sink layer 170 and data sink layer 171). Incident data 102 processed from processing platform 160 may be transmitted to and stored in the data sink layer 170. In one example, the data sink layer 171 may be stored externally on a particular client's server. The data sink layer 170 and data sink layer 171 may be implemented using a software such as, but not limited to, PostgreSQL, HIVE, Kafka, OpenSearch, and Neo4j. The data sink layer 170 may receive in-house data 103, which have been processed and received from the processing platform 160. The data sink layer 171 may receive third party data 199, which have been processed and received from the processing platform 160. The data sink layers may be configured to transfer incident data 102 to an artificial intelligence module 180. The data sink layers (e.g., the data sink layer 170 and/or the data sink layer 171) may be data lakes, data warehouses, or cloud storage systems. Each data sink layer (e.g., the data sink layer 170 and/or the data sink layer 171) may be configured to store incident data 102 in both a structured or unstructured format. The data sink layer 170 may store incident data 102 with several different formats. For example, the data sink layer 170 may support data formats such as JavaScript Objection Notation (JSON), comma-separated value (CSV), Avro, Optimized Row Columnar (ORC), Hypertext Markup Language (HTML), Extensible Markup Language (XML), or Parquet, etc. The data sink layer (e.g., data sink layer 170 or data sink layer 171), may be accessed by one or more separate components. For example, the data sink layer may be accessed by a Non-structured Query language ("NoSQL") database management system (e.g., a Cassandra cluster), a graph database management system (e.g., Neo4j cluster), further processing programs (e.g., Kafka+Flink programs), and a relation database management system (e.g., postgres cluster). Further processing may thus be performed prior to the processed data being received by the artificial intelligence module 180.

The data pipeline system 100 may include the artificial intelligence module 180. The artificial intelligence module

180 may include a machine-learning component. The artificial intelligence module 180 may use the received data in order to train and/or use a machine learning model. The artificial intelligence module 180 may be, for example, a neural network. Nonetheless, it should be noted that other machine learning techniques and frameworks may be used by the artificial intelligence module 180 to perform the methods contemplated by the present disclosure. For example, the systems and methods may be realized using other types of supervised and unsupervised machine learning techniques such as regression problems, random forest, cluster algorithms, principal component analysis (PCA), reinforcement learning, or a combination thereof. The artificial intelligence module 180 may be configured to extract and receive data from the data sink layer 170.

The system described herein may for example model the hierarchical structure of each LOB (line of business) as present in a graph database. The structure may for example be utilized to understand asynchronous IT operations event data. The system described herein may utilize an embedding model to efficiently process and analyze asynchronous IT operation event data within the hierarchical structure of each Line of Business (LOB) using a graph database. The system below may be configured to embed event data that is received asynchronous. The system may be configured to output embeddings vectors of received event data.

Figure 1B:
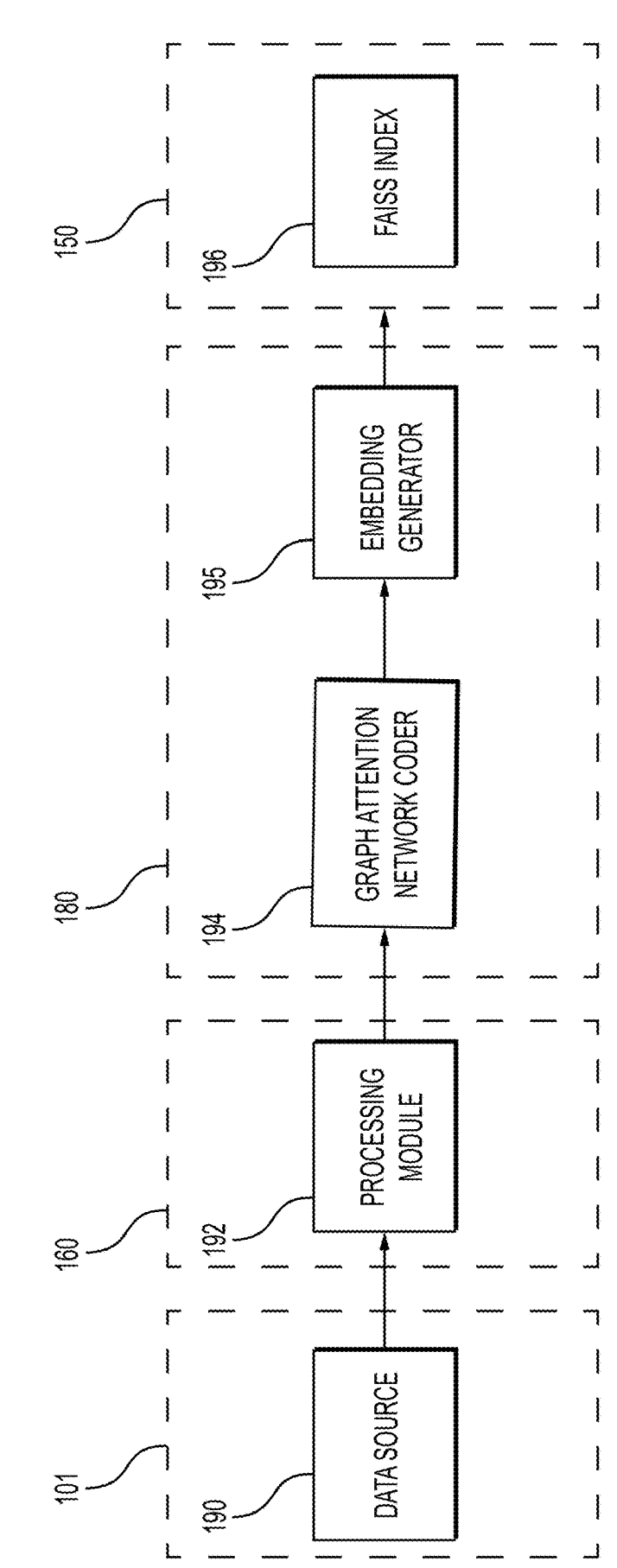
FIG. 1B depicts an exemplary system overview for determining embedding vectors for information technology events, according to one or more embodiments.

FIG. 1B depicts an exemplary system overview for determining embedding vectors for information technology events, according to one or more embodiments. The system 185 may be implemented by aspects or modules of the data pipeline system 100 from FIG. 1A or by any computing system capable of performing the procedures (e.g., computer system 500 of FIG. 5). The system 185 may include a data source 190, a processing module 192, a graph attention network (GAT) encoder 194, an embedding generator 195, and an index 196.

The data source 190 may receive data from the data source 101. The data source 190 may, for example, receive new incidents data objects and the corresponding multivariate data associated with an incident data object over a period of time. The incident data object may represent the occurrence of an incident within a system. The multivariate information may include, but is not limited to, one or more of a short description, a business category, a business sub-category, a LOB, and an incident priority. The LOB may be a category, where the LOB may include association logic linking the LOB with one or more of business services, service offerings, applications, application instances or web services, and/or servers and services.

In some examples, an initial incident received may only include minimal additional information related to the incident. For example, an incident may only include a unique ID representing the configurable item associated with the current incident. The data source 190 may further access storage (e.g., the data storage 150) to access one or more LOB association graphs stored in graph database (DB). An exemplary LOB graph that may be accessed is depicted in FIG. 4 and described below. The system may be configured to retrieve a LOB graph that includes a logical association to the received configuration item. The LOB graph that includes the related CI may be utilized for further processing to determine a vector embedding.

The processing module 192 may be implemented by the processing platform 160 and configured to extract the LOB from one or more received incidents. For example, the system may be configured to utilize the received LOB association graph and to apply an algorithm to follow the logical associations and determine a LOB associated with the particular configurable item.

The processing module 192 may extract all association logic linking's for a particular LOB. This may include all related business services, service offerings, applications, application instances or web services, and/or servers and services for a particular LOB. The processing module 192 may extract the association logic information from the graph extracted from storage (e.g., the data storage 150). The processing module 192 may be configured to generate a tree/web of associations for the particular determined LOB. The generated graph/tree of associations may be stored for the particular LOB. An exemplary graph/tree may be displayed in FIG. 3 displayed below.

The processing module 192 may further be configured to apply one or more clustering techniques to determine subtrees within the graph created by the generated graph/tree of association. By creating sets of subtrees, the system may more efficiently analyze portions of the graph that are considered most relevant. For example, the system may create two subtrees, three subtrees, or five subtrees. The system may preferably create three subtrees. The clustering techniques may be applied by implementing topic modeling within the processing module 192. For example, the topic modeling may implement Gensim. The topic modeling may include applying latent dirichlet allocation (LDA), latent semantic analysis (LSA), and/or non-negative matrix factorization (NMF) to determine topics (e.g., particular subtrees). The particular subtrees may identify the locations of the graph with the most activity (e.g., a higher number of IT events data occurring). The most activity may refer to number of IT events occurring within a set period of time. For example, the activity measured may be the amount of IT events that occurred within 1 hour, 2 hours, 4 hours, 6 hours, 12 hours, 24 hours, or 48 hours prior to performing the search. Subtrees may be generated due to the initial graphs of a LOB associations being very large. By applying the clustering techniques the system may be able to focus processing on the most relevant IT events of a LOB.

The system 185 may further include the GAT encoder 194 and the embedding generator 195. The GAT encoder 194 and the embedding generator 195 may be a part of a single graph module that is a transformer. The GAT encoder 194 and the embedding generator 195 be implemented by an artificial intelligence module 180 of FIG. 1A.

The GAT encoder 194 may incorporate GATConv, position encoding, and transformer layers to encode and decode graph and time series data. The GAT encoder 194 may be configured to produce predictions through a linear output layer. The GAT encoder 194 may be trained in a self-supervised manner, leveraging techniques such as masked graph autoencoders and proximity divergence minimization. The GAT encoder 194 may obtain weighted summations of connection information and determine weight indexes of respective nodes in the received LOB graph.

The embedding generator 195 may be configured to generate an embedding of each graph created by the GAT encoder 194. For example, the embedding generator 195 can be applied to each subtree or graph created by the GAT encoder 194. The embedding generator 195 may then aggregate the created subtrees to create a signature embedding. The signature embedding may be a representation of the incident's LOB and corresponding IT events for a period of time occurring prior to the incident.

The embedding generator 195 may reshape the embeddings into graphs with batches. The application of GAT and Transformer layers for graph reconstruction in the context of time series data, combined with self-supervised training techniques, may enable efficient scanning and embedding of heterogeneous asynchronous IT operations event data associated with configuration items.

System 185 may further include the index 196. The index 196 may be a vector database. The index 196 may be stored in the data storage 150 of FIG. 1A. The index 196 may be configured to employ techniques such as quantization, indexing, and efficient distance computation to store and process large-scale datasets. The index 196 may be configured to use vector representation of data points and to perform approximate nearest neighbor searches to find similar vectors. The index 196 may, for example, be the "Facebook AI Similarity Search" (FAISS) library.

Figure 2:
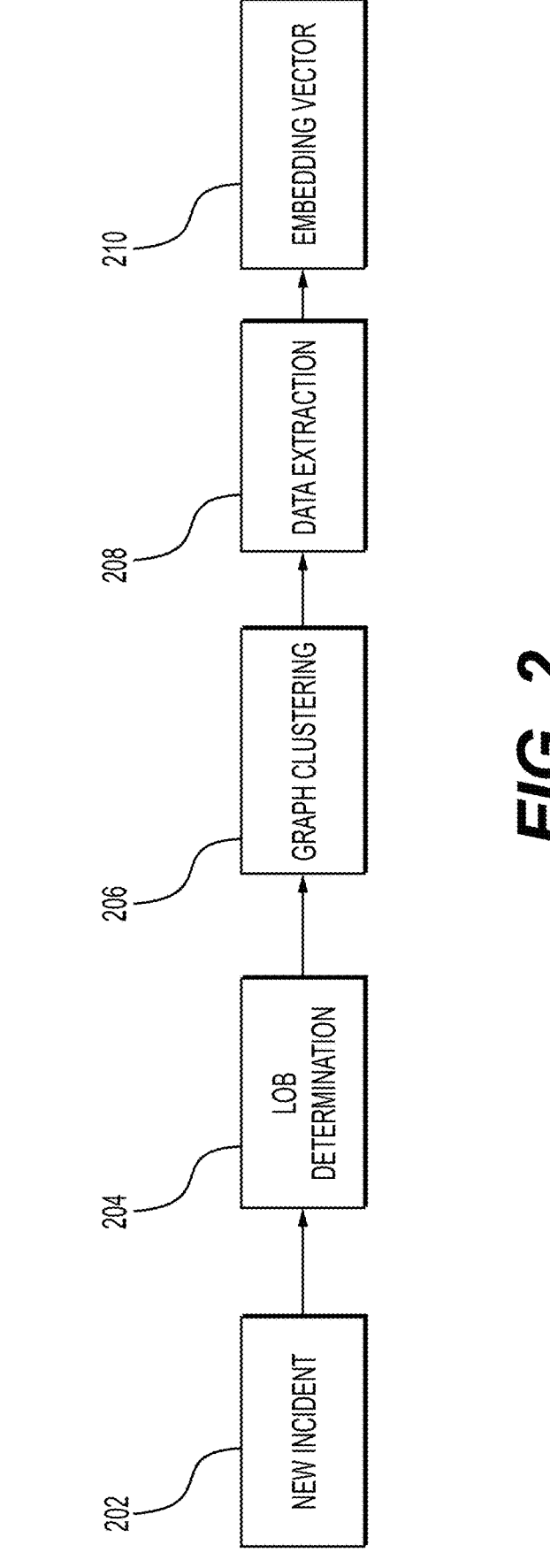
FIG. 2 depicts an exemplary flowchart of a process for determining embedding vectors for information technology operation event data, according to one or more embodiments.

FIG. 2 depicts exemplary flowchart 200 of a process for determining embedding vectors for IT operation event data, according to one or more embodiments. The method described in FIG. 2 may be implemented by the data pipeline system 100 of FIG. 1A and/or by the system 185 of FIG. 1B. Prior to this performing the method of flowchart 200, the system described herein may receive an incident with a corresponding CI.

At step 202, the system (e.g., the data source 190) may receive a current data object that indicates an occurrence of an incident. The system may further receive corresponding data. The corresponding data may include multivariate data for a particular incident and may be associated with a particular CI. For example, an incident may only include a unique ID representing the configurable item associated with the current incident. In some examples, the unique ID representing the configurable items may be assigned by an external user. In certain scenarios, an external user may associate an incorrect unique ID where the incorrect configurable item reference is assigned.

At step 204, the system may determine an LOB associated with the CI. In an example, the system may import one or more LOB graphs from storage. An exemplary graph 300 may be displayed in FIG. 3 The LOB graphs may be a knowledge based graphs that include logical associations between a LOB and corresponding IT event data and corresponding CIs. The system may be configured to retrieve a CI's line of business by traversing a LOB graph to determine an LOB. For example, the system may utilize the unique ID representing the configurable items to search and traverse the received LOB graph to determine an associated LOB. In some examples, the multivariate data received with the current incident may include a LOB data variable. The LOB may be stored in a description of the incident.

The LOB graphs may for example have been determined by applying the techniques of a concurrently-filed application. The concurrently-filed application has a first named inventor of Ranadhir Ghosh, is titled "SYSTEMS AND METHODS FOR DETERMINING AND UPDATING KNOWLEDGE GRAPHS OF INFORMATION TECHNOLOGY EVENT DATA AND CONFIGURATION ITEMS,". This application is incorporated in its entirety herein.

Upon determining a LOB, the system may be configured to obtain an LOB graph that includes the determined LOB from step 204. The LOB graph may include all association and IT operation data associated with a particular LOB, including the received incident data from step 202. For example, the LOB graph may include timestamps of all IT event data that occurred within the LOB graph. The processing may further include extracting a portion of the graph that includes the determined LOB and all associated event data. This may assist in analyzing only the relevant portion of the initially received LOB graph.

At step 206, the system (e.g., the processing module 192) may be configured to apply clustering techniques to the determined LOB graph to determine a subset of graphs. A LOB graph may have thousands of logical associations between the LOB, IT events, and corresponding CIs. The large amount of associations may make an entire LOB graph complex and inefficient to further analyze. Step 206 may be utilized to identify a subset of nodes within the LOB graph that are active. This may refer to CI's where signals have occurred (e.g., IT event data has occurred) during a set period of time.

The system may thus apply one or more clustering algorithms to the determined LOB graph using an adjacency matrix. The application of clustering algorithms may identify a set number of the most active clusters based on the IT operation event data may be determined (e.g., over a set temporal time such as over the last hour or last two hours). Various clustering algorithms may be applied at step 206. For example, unsupervised topic models may be applied to determine the clusters. For example, topic modeling may be applied which may include applying latent dirichlet allocation (LDA), latent semantic analysis (LSA), and/or non-negative matrix factorization (NMF) algorithms. The determined sub-graphs may include the nodes, edges (e.g., associations), and properties of the relevant section of the LOB graph.

Upon applying the clustering algorithm, a set of subgraphs (e.g., two sub-graphs, three sub-graphs, five subgraphs, etc.) may be determined by the system. The subgraphs may for example may include the most active regions of a LOB. Each sub-graph may for example include up to a few hundred nodes (e.g., 200 nodes) of data. In some examples the sub-graph may be larger and have a few thousands nodes. The set of sub-graphs may for example include sub section of an LOB most effected by events over a period of time. For example, the identified sub-graphs may represent the CI's with the highest number of signals (e.g., IT events) over a given period of time.

At step 208, data extraction may be applied on the identified subset of graphs from step 206. The extracted data may include all IT event data (e.g., all alerts, changes, problem, incident, and anomaly data) that occurred over a set period of time. The set period of time may be a set of hours (e.g., one hour, two hours, four hours, eight hours, twelve hours, or twenty-four hours) prior to the incident from step 202 occurred. The extracted event data may be sequenced and saved.

At step 210, an embedding model may be applied to the extracted data of each subset of graphs to determine an embedding vector for each subset of graphs. Alternatively, step 210 may be applied to directly to the subgraphs from step 206. At step 210, two separate models may be applied to each of the subsets of graphs (1) a Graph Attention Network (GAT) encoder (e.g., the GAT encoder 194) and (2) a future node embedding predictor (e.g., the embedding generator). The GAT and Transformer layers may be configured to apply graph reconstruction in the context of time series data, combined with self-supervised training techniques, enabling efficient scanning and embedding of heterogeneous asynchronous IT operations event data associated with configuration items.

The GAT encoder may be configured to incorporate GATConv, Positional Encoding, and Transformer layers to encode and decode the graph and time series data, producing predictions through a linear output layer. For each sub-graph GAT encoder may calculate attention scores, aggregate the features of neighboring nodes weighted by respective attention scores, and then have feature transformation applied (e.g., by GATConv). Further, positional encoding may be applied to determine vector representations. The GAT encoder may apply techniques such as masked graph autoencoders and proximity divergence minimization.

The future node embedding predictor may reshape embeddings into graphs with batches. The embedding predictor may generate the embeddings for output.

The embedding vectors for each subgraph may be saved to storage and further use. Further, the embedding vectors for each sub-graph may be aggregated (e.g., by averaging the vales of the vector) for each subset of graph to determine a signature embedding vector. The embedding vectors and the signature embedding vector may be saved to storage.

The system may further utilize the determined signature embedding vector to perform further analysis of the current data object. For example, vector indexing (e.g., by FAISS indexing) may applied to set of signature embedding to retrieve similar events when a new event occurs, allowing for the suggestion of resolution steps based on similar IT operations events. The vector indexing may for example embeds historical events and identifies highly similar events when a new event occurs, allowing for the suggestion of resolution steps based on similar IT operations events.

For example, an application of the determined signature embedding may be described in a corresponding application being filed the same day as the application described herein. This application has a first named inventor of Ranadhir Ghosh, is titled "SYSTEMS AND METHODS FOR DETERMINING HISTORICAL INCIDENT SIMILARITY PREDICTIONS USING SIGNAL SIMILARITIES BASED ON GRAPH MODELLING,". This application is incorporated in its entirety herein and describes an exemplary utilization of the signature embedding vector to perform further analysis of the current data object.

FIG. 3 depicts an exemplary graph 300 of logical associations of a hierarchical structure for a line of business (LOB) in a graph database, according to one or more embodiments. FIG. 3 depicts an exemplary LOB graph 300 that is received at step 204. The LOB graph 300 may include sets of configurable item nodes (e.g., node 304) that are connected by associations (e.g., association 306). The nodes 304 may represent configuration items such as, but not limited to, business services, service offerings, applications, application instances or web services, and/or servers and services The nodes 304 of graph 300 may be connected by logical associations. By following/traversing a set of logical associations, an associated LOB 302 may be determined for the graph.

FIG. 4 depicts a flowchart of a method 400 for determining an embedding vector for information technology events, according to one or embodiments.

Step 402 may include receiving a current data object representing an occurrence of an information technology event associated with a configurable item. The information technology event may be either an alert, incident, problem, or change.

Step 404 may include obtaining a graph database of logical associations of the configurable item.

The method may further include determining a line of business associated with the configurable item associated with the current data object by traversing nodes of the graph database until a line of business node indicates the line of business associated with the configurable item is determined; and determining all nodes and edges associated with the determined line of business node.

Step 406 may include applying a clustering algorithm to the graph database to determine a subset of graphs. For example, the clustering algorithm may only be applied on the determined all nodes and edges associated with the determined line of business node. The graph database of logical associations includes all nodes and relationships of the line of business and of related configurable items and IT events. The clustering algorithm may determine subsets of the graph database that have had a highest number of information technology events occur within a set period of time.

Step 406 may further include extracting associated data of the subset of graphs.

Step 408 may include applying an embedding model to the extracted associated data to determine an embedding vector for each subset of graphs. The embedding model includes a transformer with graph attention network encoder and a future node embedding predictor. This may include encoding and decoding, using the graph attention network encoder, the extracted associated data from each subset of graph, producing a respective linear output layer for each graph. This may further include reshaping, using the future node embedding predictor, the respective linear output layer for each subset of graph into the embedding vector for each subset of graph.

Step 410 may include aggregating the embedding vector for each subset of graphs to determine a signature embedding vector.

Step 412 may include utilizing the signature embedding vector to perform further analysis of the current data object.

Figure 5:
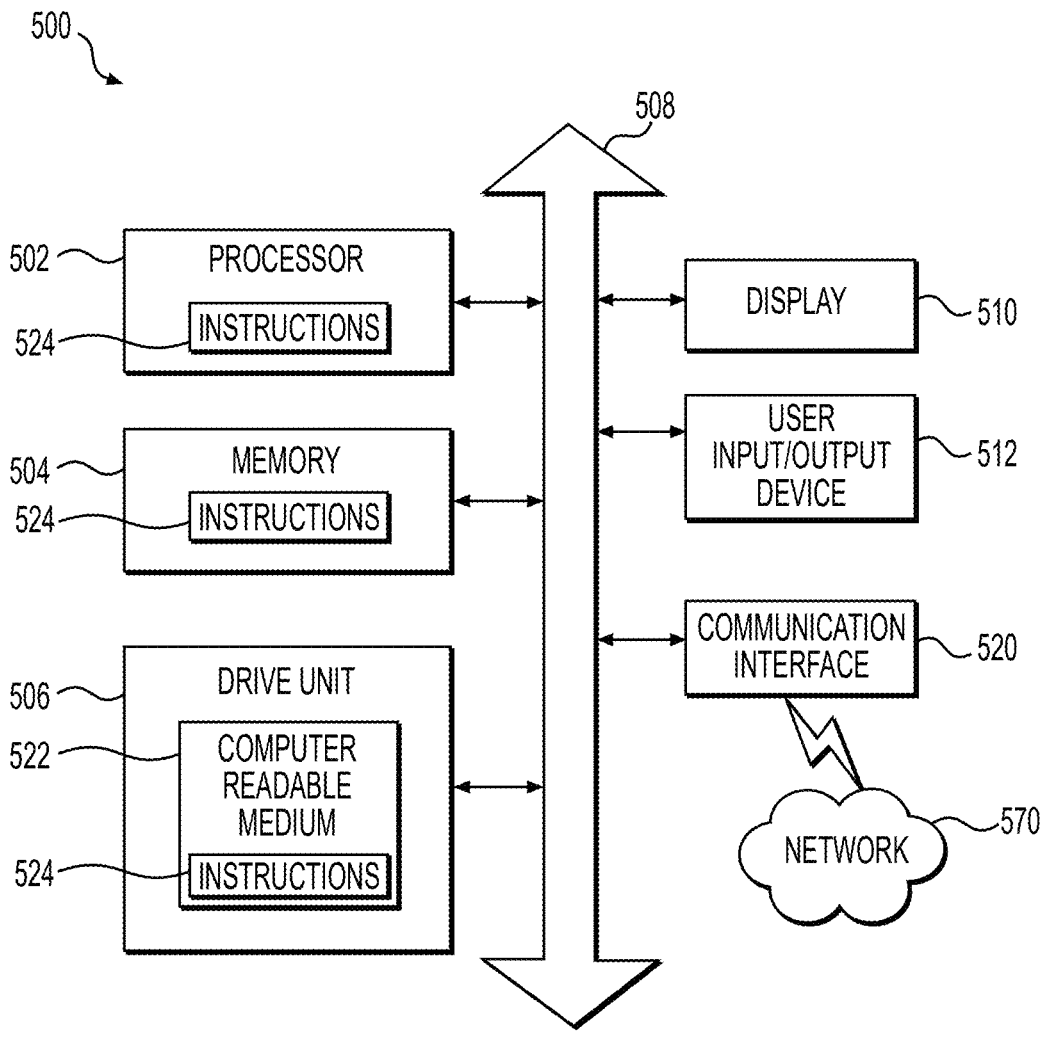
FIG. 5 illustrates a computer system for executing the techniques described herein, according to one or more embodiments of the present disclosure.

As illustrated in FIG. 5, the computer system 500 may include a processor 502, e.g., a central processing unit (CPU), a graphics processing unit (GPU), or both. The processor 502 may be a component in a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may implement a software program, such as code generated manually (i.e., programmed).

The computer system 500 may include a memory 504 that can communicate via a bus 508. The memory 504 may be a main memory, a static memory, or a dynamic memory. The memory 504 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 504 includes a cache or random-access memory for the processor 502. In alternative implementations, the memory 504 is separate from the processor 502, such as a cache memory of a processor, the system memory, or other memory. The memory 504 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 504 is operable to store instructions executable by the processor 502. The functions, acts or tasks illustrated in the figures or described herein may be performed by the programmed processor 502 executing the instructions stored in the memory 504. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel payment and the like.

As shown, the computer system 500 may further include a display unit 510, such as a liquid crystal display (LCD), an organic light emitting diode (OLED), a flat panel display, a solid-state display, a cathode ray tube (CRT), a projector, a printer or other now known or later developed display device for outputting determined information. The display unit 510 may act as an interface for the user to see the functioning of the processor 502, or specifically as an interface with the software stored in the memory 504 or in the drive unit 506.

Additionally or alternatively, the computer system 500 may include an input/output device 512 configured to allow a user to interact with any of the components of system 500. The input/output device 512 may be a number pad, a keyboard, or a cursor control device, such as a mouse, or a joystick, touch screen display, remote control, or any other device operative to interact with the computer system 500.

The computer system 500 may also or alternatively include a disk or optical drive unit 506. The disk drive unit 506 may include a computer-readable medium 522 in which one or more sets of instructions 524, e.g., software, can be embedded. Further, the instructions 524 may embody one or more of the methods or logic as described herein. The instructions 524 may reside completely or partially within the memory 504 and/or within the processor 502 during execution by the computer system 500. The memory 504 and the processor 502 also may include computer-readable media as discussed above.

In some systems, a computer-readable medium 522 includes instructions 524 or receives and executes instructions 524 responsive to a propagated signal so that a device connected to a network 570 can communicate voice, video, audio, images, or any other data over the network 570. Further, the instructions 524 may be transmitted or received over the network 570 via a communication port or interface 520, and/or using a bus 508. The communication port or interface 520 may be a part of the processor 502 or may be a separate component. The communication port 520 may be created in software or may be a physical connection in hardware. The communication port 520 may be configured to connect with a network 570, external media, the display unit 510, or any other components in system 500, or combinations thereof. The connection with the network 570 may be a physical connection, such as a wired Ethernet connection or may be established wirelessly as discussed below. Likewise, the additional connections with other components of the system 500 may be physical connections or may be established wirelessly. The network 570 may alternatively be directly connected to the bus 508.

While the computer-readable medium 522 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 522 may be non-transitory, and may be tangible.

The computer-readable medium 522 can include a solid-state memory such as a memory card or other package that houses one or more non-volatile read-only memories. The computer-readable medium 522 can be a random-access memory or other volatile re-writable memory. Additionally or alternatively, the computer-readable medium 522 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 500 may be connected to one or more networks 570. The network 570 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 570 may include wide area networks (WAN), such as the Internet, local area networks (LAN), campus area networks, metropolitan area networks, a direct connection such as through a Universal Serial Bus (USB) port, or any other networks that may allow for data communication. The network 570 may be configured to couple one computing device to another computing device to enable communication of data between the devices. The network 570 may generally be enabled to employ any form of machine-readable media for communicating information from one device to another. The network 570 may include communication methods by which information may travel between computing devices. The network 570 may be divided into sub-networks. The sub-networks may allow access to all of the other components connected thereto or the sub-networks may restrict access between the components. The network 570 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel payment. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that a claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the function.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for determining a signature embedding vector for information technology events, the method comprising:

receiving a current data object representing an occurrence of an information technology event associated with a configurable item;

obtaining a graph database of logical associations of the configurable item;

applying a clustering algorithm to the graph database to determine a subset of graphs;

extracting associated data of the subset of graphs;

applying an embedding model to the extracted associated data to determine an embedding vector for each subset of graphs, wherein the embedding model includes a transformer with a graph attention network encoder and a future node embedding predictor, wherein applying an embedding model to the extracted associated data to determine an embedding vector for each subset of graphs further includes:

encoding and decoding, using the graph attention network encoder, the extracted associated data from each subset of graphs, producing a respective linear output layer for each graph; and reshaping, using the future node embedding predictor, the respective linear output layer for each subset of graphs into the embedding vector for each subset of graphs;

aggregating the embedding vector for each subset of graphs to determine a signature embedding vector; and utilizing the signature embedding vector to perform further analysis of the current data object.

2. The method of claim 1, wherein the information technology event is either an alert, incident, problem, or change.

3. The method of claim 1, further including:

determining a line of business associated with the configurable item associated with the current data object by traversing nodes of the graph database until a line of business node indicates the line of business associated with the configurable item is determined; and determining all nodes and edges associated with the determined line of business node;

wherein the clustering algorithm is only applied on the determined all nodes and edges associated with the determined line of business node.

4. The method of claim 3, wherein the graph database of logical associations includes all nodes and relationships of the line of business and of related configurable items and IT events.

5. The method of claim 1, wherein the clustering algorithm determines subsets of the graph database that have had a highest number of information technology events occur within a set period of time.

6. A system for determining a signature embedding vector for information technology events, the system comprising:

a memory having processor-readable instructions stored therein; and at least one processor configured to access the memory and execute the processor-readable instructions to perform operations including:

receiving a current data object representing an occurrence of an information technology event associated with a configurable item;

obtaining a graph database of logical associations of the configurable item;

applying a clustering algorithm to the graph database to determine a subset of graphs;

extracting associated data of the subset of graphs;

applying an embedding model to the extracted associated data to determine an embedding vector for each subset of graphs, wherein the embedding model includes a transformer with a graph attention network encoder and a future node embedding predictor, wherein applying an embedding model to the extracted associated data to determine an embedding vector for each subset of graphs further includes:

encoding and decoding, using the graph attention network encoder, the extracted associated data from each subset of graphs, producing a respective linear output layer for each graph; and reshaping, using the future node embedding predictor, the respective linear output layer for each subset of graphs into the embedding vector for each subset of graphs;

aggregating the embedding vector for each subset of graphs to determine a signature embedding vector; and utilizing the signature embedding vector to perform further analysis of the current data object.

7. The system of claim 6, wherein the information technology event is either an alert, incident, problem, or change.

8. The system of claim 6, further including:

determining a line of business associated with the configurable item associated with the current data object by traversing nodes of the graph database until a line of business node indicates the line of business associated with the configurable item is determined; and determining all nodes and edges associated with the determined line of business node;

wherein the clustering algorithm is only applied on the determined all nodes and edges associated with the determined line of business node.

9. The system of claim 8, wherein the graph database of logical associations includes all nodes and relationships of the line of business and of related configurable items and IT events.

10. The system of claim 6, wherein the clustering algorithm determines subsets of the graph database that have had a highest number of information technology events occur within a set period of time.

11. A non-transitory computer readable medium storing processor-readable instructions which, when executed by at least one processor, cause the at least one processor to perform operations including:

receiving a current data object representing an occurrence of an information technology event associated with a configurable item;

obtaining a graph database of logical associations of the configurable item;

applying a clustering algorithm to the graph database to determine a subset of graphs;

extracting associated data of the subset of graphs;

applying an embedding model to the extracted associated data to determine an embedding vector for each subset of graphs, wherein the embedding model includes a transformer with a graph attention network encoder and a future node embedding predictor, wherein applying an embedding model to the extracted associated data to determine an embedding vector for each subset of graphs further includes:

encoding and decoding, using the graph attention network encoder, the extracted associated data from each subset of graphs, producing a respective linear output layer for each graph; and reshaping, using the future node embedding predictor, the respective linear output layer for each subset of graphs into the embedding vector for each subset of graphs;

aggregating the embedding vector for each subset of graphs to determine a signature embedding vector; and utilizing the signature embedding vector to perform further analysis of the current data object.

12. The non-transitory computer readable medium of claim 11, wherein the information technology event is either an alert, incident, problem, or change.

13. The non-transitory computer readable medium of claim 11, further including:

determining a line of business associated with the configurable item associated with the current data object by traversing nodes of the graph database until a line of business node indicates the line of business associated with the configurable item is determined; and determining all nodes and edges associated with the determined line of business node;

wherein the clustering algorithm is only applied on the determined all nodes and edges associated with the determined line of business node.

14. The non-transitory computer readable medium of claim 13, wherein the graph database of logical associations includes all nodes and relationships of the line of business and of related configurable items and IT events.

15. The non-transitory computer readable medium of claim 11, wherein the clustering algorithm determines subsets of the graph database that have had a highest number of information technology events occur within a set period of time.

* * * * *